US012768501B2

(12) United States Patent
Chen et al.

(10) Patent No.: US 12,768,501 B2
(45) Date of Patent: Oct. 20, 2026

(54) CONDENSATION-RECOVERY DEVICE FOR OVERPRESSURE GAS BASED ON LIQUEFIED NATURAL GAS (LNG) COLD ENERGY

(71) Applicants: ZHOUSHAN INSTITUTE OF CALIBRATION AND TESTING FOR QUALITY AND TECHNOLOGY SUPERVISION, Zhoushan (CN); ENN (Zhoushan) LNG Co., Ltd., Zhoushan (CN)

(72) Inventors: Xianlei Chen, Zhoushan (CN); Jianhui He, Zhoushan (CN); Bohong Wang, Zhoushan (CN); Huadong Hao, Zhoushan (CN); Bin Wang, Zhoushan (CN); Jianfeng Liu, Zhoushan (CN); Hengcong Tao, Zhoushan (CN); Haolei Shi, Zhoushan (CN); Panfeng Li, Zhoushan (CN); Jiguang Ou, Zhoushan (CN)

(73) Assignees: ZHOUSHAN INSTITUTE OF CALIBRATION AND TESTING FOR QUALITY AND TECHNOLOGY SUPERVISION, Zhoushan City (CN); ENN (Zhoushan) LNG Co., Ltd., Zhoushan (CN)

( * ) Notice: Subject to any disclaimer, the term of this patent is extended or adjusted under 35 U.S.C. 154(b) by 228 days.

(21) Appl. No.: 18/534,204

(22) Filed: Dec. 8, 2023

(65) Prior Publication Data

US 2024/0102613 A1 Mar. 28, 2024

Related U.S. Application Data

(63) Continuation of application No. PCT/CN2023/127088, filed on Oct. 27, 2023.

(30) Foreign Application Priority Data

Sep. 8, 2023 (CN) ........................ 202311154346.2

(51) Int. Cl.
*F25J 1/02* (2006.01)
*F17C 9/04* (2006.01)
(Continued)

(52) U.S. Cl.
CPC ............... *F17C 9/04* (2013.01); *F25J 1/0025* (2013.01); *F25J 1/0221* (2013.01); *F28C 3/06* (2013.01);
(Continued)

(58) Field of Classification Search
CPC ......... F17C 2265/033; F17C 2265/034; F28C 3/08; F28C 3/06; F25J 1/0221; F25J 1/0025; F25J 2270/904
(Continued)

(56) References Cited

U.S. PATENT DOCUMENTS 3,981,156 A * 9/1976 Modisette .......... B01D 53/1487
261/126
6,470,706 B1 * 10/2002 Engdahl ................ B01D 5/003
62/614
(Continued)

FOREIGN PATENT DOCUMENTS

CN 206530872 U 9/2017
CN 208887235 U * 5/2019
(Continued)

*Primary Examiner* — John F Pettitt, III

(57) ABSTRACT

A condensation-recovery device for overpressure gas based on liquefied natural gas (LNG) cold energy, including a tank body and a condensation cavity provided on a bottom thereof. LNG is stored in the condensation cavity to condense boil-off gas (BOG). The condensation cavity includes a vertical hollow tube arranged in the tank body, and an engagement mechanism is provided on a bottom of the
(Continued)

vertical hollow tube. The vertical hollow tube is configured such that the gas can experience preliminary contact with the LNG when flowing therein, and the gas will continuously enter the vertical hollow tube under the action of pressure difference. After entering the conical tube, the gas will be distributed along the cavity of the conical tube to spread downward, so as to increase a contact time of the gas and the LNG while avoiding expanding diffusion area of the gas after entering the LNG.

9 Claims, 9 Drawing Sheets

(51) Int. Cl.

| | |
|---|---|
| ***F25J 1/00*** | (2006.01) |
| ***F28C 3/06*** | (2006.01) |
| ***F28C 3/08*** | (2006.01) |

(52) U.S. Cl.
CPC .......... *F28C 3/08* (2013.01); *F17C 2221/033* (2013.01); *F17C 2225/0161* (2013.01); *F17C 2265/034* (2013.01); *F25J 2270/904* (2013.01)

(58) Field of Classification Search
USPC .......................................................... 261/151
See application file for complete search history.

(56) References Cited

U.S. PATENT DOCUMENTS

| | | | | |
|---|---|---|---|---|
| 2007/0214831 | A1* | 9/2007 | Nanda | B01D 5/0003 62/48.2 |
| 2012/0103561 | A1* | 5/2012 | Turner | F25J 3/0635 165/47 |
| 2018/0172345 | A1* | 6/2018 | Ikeda | F25J 1/0092 |
| 2019/0226758 | A1 | 7/2019 | Atapattu et al. | |

FOREIGN PATENT DOCUMENTS

| | | | | | |
|---|---|---|---|---|---|
| CN | 212107873 | U | * | 12/2020 | |
| CN | 212548369 | U | | 2/2021 | |
| CN | 114699790 | A | | 7/2022 | |
| CN | 216976501 | U | | 7/2022 | |
| CN | 217733019 | U | * | 11/2022 | |
| CN | 218993823 | U | | 5/2023 | |
| JP | H1163396 | A | | 3/1999 | |
| KR | 20080022651 | A | * | 3/2008 | F28C 1/02 |
| KR | 20120110835 | A | | 10/2012 | |
| KR | 20150140566 | A | * | 12/2015 | F17C 7/04 |

* cited by examiner

CONDENSATION-RECOVERY DEVICE FOR OVERPRESSURE GAS BASED ON LIQUEFIED NATURAL GAS (LNG) COLD ENERGY

CROSS-REFERENCE TO RELATED APPLICATIONS

This application is a continuation of International Patent Application No. PCT/CN2023/127088, filed on Oct. 27, 2023, which claims the benefit of priority from Chinese Patent Application No. 202311154346.2, filed on Sep. 8, 2023. The content of the aforementioned applications, including any intervening amendments thereto, are incorporated herein by reference.

TECHNICAL FIELD

This application relates to utilization of liquefied natural gas (LNG) cold energy for power generation, and more particularly to a condensation-recovery device for overpressure gas based on LNG cold energy.

BACKGROUND

Liquefied natural gas (LNG) cold energy system is an efficient and environmentally-friendly cold energy utilization technology, which has been widely used in LNG carriers, LNG terminals, LNG transport vehicles, and LNG filling station. The LNG cold energy system manly plays a role in efficiently recovering and utilizing the cold energy released in the processes of LNG evaporation and gasification. LNG will inevitably undergo heat exchange with the outside, and the temperature will rise, so that part of the liquefied gas will evaporate to form overpressure gas, such as propane, ethylene and BOG (Boil-Off Gas).

The existing recovery systems adopt a BOG high-pressure compression-output mode, which results in high power consumption. Overpressure gas is often treated by combustion after discharged, which will lead to resource waste. Moreover, as a combustible gas with high GWP (Global Warming Potential), the overpressure gas may aggravate the greenhouse effect after discharged into the air. From economic, environmental and safety considerations, BOG is needed to be re-liquefied and stored. However, the traditional re-liquidation uses a cryogenic refrigerant (such as LNG and liquid nitrogen) for heat exchange with BOG, which has high transportation requirement and high operation cost. Moreover, this re-liquidation technology is not conducive to the low-energy consumption and efficient operation of BOG recovery systems.

Chinese Patent No. 216976501U proposes a condensation-recovery system of BOG, which includes a tank body, a maze component, a BOG input pipe, a first spray system and an LNG input pipe. The maze component includes a plurality of division plates arranged spaced apart along a vertical direction in the tank body, and any two adjacent division plates are staggered. The liquid level of LNG contained in the tank body is higher than the maze component. The BOG input pipe is connected with the tank body, and a connection between the BOG input pipe and the tank body is located below the maze component. The maze component can effectively prolong the retention time of the BOG to promote the liquefaction. The first spray system is provided at an inner top of the tank body, and is configured to spray LNG into the tank body. The LNG input pipe is configured to supply LNG to the first spray system. Such BOG condensation-recovery system has simple structure, and can avoid waste and pollution. The multi-stage condensation system can improve the condensation efficiency of BOG to a certain extent; however, the multi-layer division plate arranged in a single stage to extend the retention of gas in liquid cannot significantly improve the condensation efficiency of the BOG.

SUMMARY

An object of the present disclosure is to provide a condensation-recovery device for overpressure gas based on an LNG cold energy to overcome the problem of low condensation and recovery efficiency of BOG in the prior art.

In order to arrive at the above purpose, technical solutions of the present disclosure are described as follows.

The present disclosure provides a condensation-recovery device for overpressure gas based on an LNG cold energy, comprising:

- a tank body; and
- a primary condensation cavity;
- wherein an upper end of the tank body is connected with an outlet, and a lower end of the tank body is connected to an inlet; and
- the primary condensation cavity is arranged at a bottom of the tank body; an interior of the primary condensation cavity is configured to store an LNG to condense boil-off gas (BOG); the primary condensation cavity includes a vertical hollow tube arranged in the tank body; a bottom of the vertical hollow tube is provided with a engagement mechanism; and a conical tube is fixedly provided on a top of the vertical hollow tube, and the conical tube is communicated with the vertical hollow tube.

In an embodiment, a side wall of the conical tube is provided with a cavity, and the cavity is communicated with a hollow portion of the vertical hollow tube.

In an embodiment, the engagement mechanism includes a square block, and the square block is fixedly connected with the bottom of the vertical hollow tube. An interior of the square block is hollow, and two sides of the square block are each provided with a through groove. An inner side of the through groove is provided with an enclosed slot. An end surface of the square block away from the vertical hollow tube is movably provided with a connecting pipe. And two sides of the connecting pipe corresponding to the enclosed slot are each fixedly provided with a closing plate, and two sides of the closing plate are each provided with a return spring.

In an embodiment, a size and a position of the closing plate are configured to fit the enclosed slot, and the closing plate is configured to be insertable into enclosed slot to block the through groove.

In an embodiment, the tank body is connected with an LNG input pipe and an LNG output pipe. The LNG input pipe is configured to extend into the primary condensation cavity, and an end of the LNG input pipe is fixedly communicated with a top of the conical tube. A spiral plate is arranged around an interior of the conical tube from top to bottom, and is arranged on an LNG delivering path in the LNG input pipe.

In an embodiment, a top of the primary condensation cavity is provided with a perforated plate. After the LNG is fed into the primary condensation cavity, a liquid level of the LNG in the primary condensation cavity is lower than the perforated plate. Residual gas in the primary condensation cavity is allowed to be discharged from holes of the perforated plate to an upper part of the tank body.

In an embodiment, the LNG output pipe is provided on a bottom of the primary condensation cavity, and the LNG is configured to be cyclically input.

In an embodiment, a secondary condensation cavity is provided inside the tank body and above the primary condensation cavity. The secondary condensation cavity includes a conical table. An interior of the conical table is provided with a conical cavity, and the conical cavity is configured to receive gas from the primary condensation cavity. An atomizing sprayer is fixedly arranged on a top of the conical table. And the atomizing sprayer is configured to produce an atomized mist within an annular range to cool and condense the gas from the primary condensation cavity.

The conical table has an inverted trumpet shape, and the conical table consists of a mouth portion and a trumpet-shaped body. And the trumpet-shaped body is provided with a plurality of leakage holes to discharge gas from the primary condensation cavity, and the mouth portion is provided with an arc return port.

The plurality of leakage holes are circumferentially provided on the trumpet-shaped body at different heights.

Compared to the prior art, the present disclosure has the following beneficial effects.

(1) Because of the shape and position of the vertical hollow tube are designed, such that the gas can experience a preliminary contact with the condensate in a flow process in the vertical hollow tube. Owing to a presence of pressure difference, the gas at the inlet will continuously enter the vertical hollow tube. After the gas entering the conical tube, the gas will be distributed along the cavity of the conical tube to spread downward, so as to increase a contact time of the gas and the condensate while avoiding expanding diffusion area of the gas after entering the condensate, which can fully utilize the condensate in the primary condensation cavity with finite volume.

(2) The BOG, which can be fed through the inlet, enters the cavity of the conical tube through the hollow portion of the vertical hollow tube, and the BOG moves from bottom to top along the bottom of the vertical hollow tube. When the BOG enters the conical tube after moving to the top of the vertical hollow tube, the BOG will move from top to bottom along the cavity of the conical tube with the presence of pressure because of a volume of the conical tube. Because of the presence of a conical cavity, the BOG gradually fills the cavity of the conical tube during the BOG moves downward from a preliminary narrow space, and as a volume of the cavity increases, the filled BOG increases, so as to affect a contact time of the BOG and the condensate per unit time and improve an efficiency of gas condensation and recycle.

(3) The connecting pipe is pushed to be insertable into the square block through the inlet, at this time, the return spring is squeezed and has an elastic potential energy. And the closing plate is configured to be insertable into the enclosed slot along with the connecting pipe, at this time, the closing plate is closed, and the through groove of the square block are closed. The gas at the inlet can enter the vertical hollow tube through the connecting pipe. After condensation, the inlet leaves from the connecting pipe, and under the action of the elastic potential energy of the return spring, the connecting pipe is forced to leave from the square block. At this time, the closing plate leaves from the enclosed slot, and the through groove of the square block are opened. And the gas retaining in the vertical hollow tube will directly enter the primary condensation cavity through the through groove, so as to avoid a problem of return.

(4) The LNG enters the primary condensation cavity from the LNG input pipe, and will spiral along the spiral plate when entering because the presence of the spiral plate affects a flow direction of the LNG. At the beginning, under the action of pressure difference, the LNG will form a vortex after entering the spiral plate. Because of the presence of the spiral plate, the vortex will flow downward from the top of the conical tube, and will gradually disappear after reaching a bottom of the conical tube because of the presence of a guard wall of the conical tube. Therefore, when the BOG enters the primary condensation cavity from the conical tube, the presence of the vortex of the condensate accelerates a diffusion of the condensate, which improves condensation efficiency.

In the figures: 10, tank body; 11, outlet; 12, inlet; 20, primary condensation cavity; 21, vertical hollow tube; 22, engagement mechanism; 221, square block; 222, through groove; 223, enclosed slot 224, connecting tube; 225, closing plate; 226, return spring; 23, conical tube; 30, LNG input pipe; 31, spiral plate; 40, perforated plate; 50, secondary condensation cavity; 51, conical table; 52, leakage hole; 521, mouth portion; 522, trumpet-shaped body; 523, arc return port; 60, atomizing sprayer; and 70, LNG output pipe.

DETAILED DESCRIPTION OF EMBODIMENTS

Figure 1:
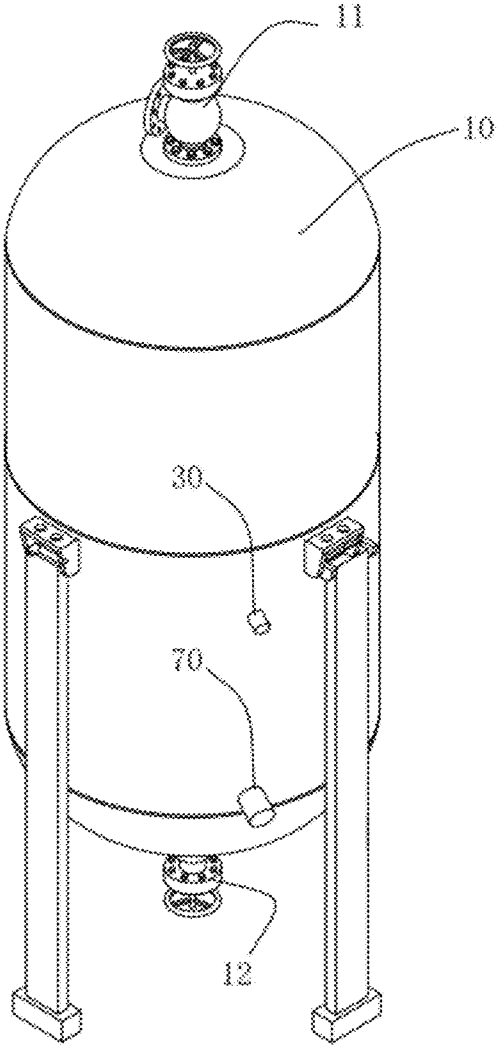
FIG. 1 schematically shows an overall structure of a condensation-recovery device according to an embodiment of the present disclosure.

Referring to FIG. 1, a condensation-recovery device for overpressure gas based on a liquefied natural gas (LNG) cold energy power generation system includes a tank body 10, an outlet 11 arranged above the tank body 10, and an inlet 12 arranged below the tank body 10. Boil-off gas BOG is fed into the tank body 10 from the inlet 12, and then is discharged from the outlet 11. In this process, the BOG is condensed and recycled through a condensation device in the tank body 10. After a recovery, if the BOG cannot be completely condensed, it will return to the inlet 12 from the outlet 11 and will be fed into the tank body 10 again to be condensed.

Figure 2:
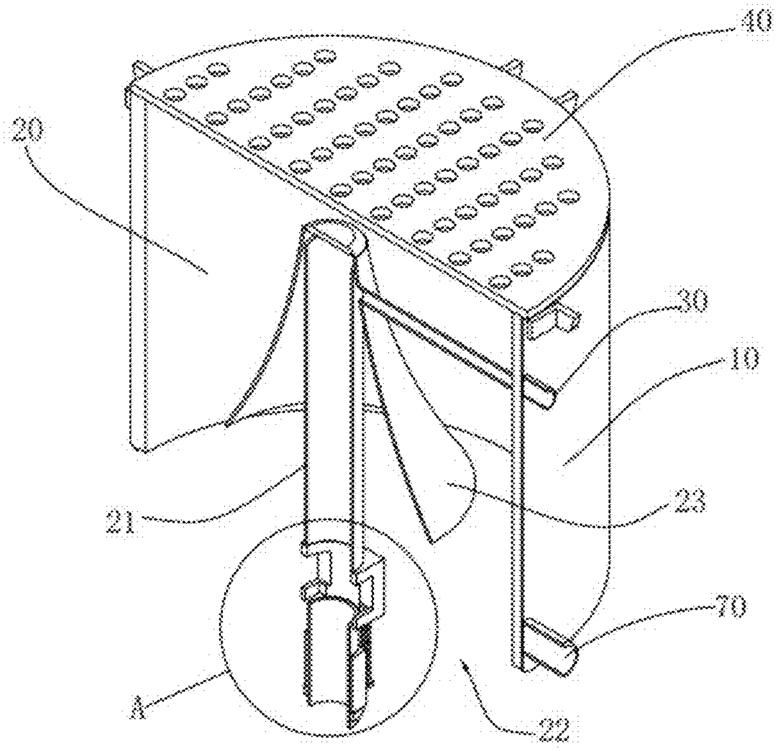
FIG. 2 is a cutaway view of a primary condensation cavity according to an embodiment of the present disclosure.

Referring to FIG. 2, a primary condensation cavity 20 is arranged below the tank body 10 to improve condensation effects. The primary condensation cavity 20 includes a vertical hollow tube 21 arranged in the tank body 10, and a bottom of the vertical hollow tube 21 is provided with an engagement mechanism 22 corresponding to the inlet 12. The vertical hollow tube 21 is hollow, and a conical tube 23 is fixedly arranged at a top of the vertical hollow tube 21 and the conical tube 23 is communicated with the vertical hollow tube 21. A side wall of the conical tube 23 is provided with a cavity, and the cavity is communicated with a hollow portion of the vertical hollow tube 21. In an embodiment, the BOG, which can be fed into through the inlet 12, is fed into the cavity of the conical tube 23 through the hollow portion of the vertical hollow tube 21, and the BOG moves from bottom to top along the bottom of the vertical hollow tube 21. When the BOG enters the conical tube 23 after moving to the top of the vertical hollow tube 21, the BOG will move from top to bottom along the cavity of the conical tube 23 with the presence of pressure because of a volume of the conical tube 23. Because of the presence of a conical cavity, the BOG gradually fills the cavity of the conical tube 23 during the BOG moves downward from a preliminary narrow portion, and as a volume of the cavity increases, the filled BOG increases, so as to affect a contact time of the BOG and the condensate per unit time and improve an efficiency of gas condensation and recovery.

Figure 5:
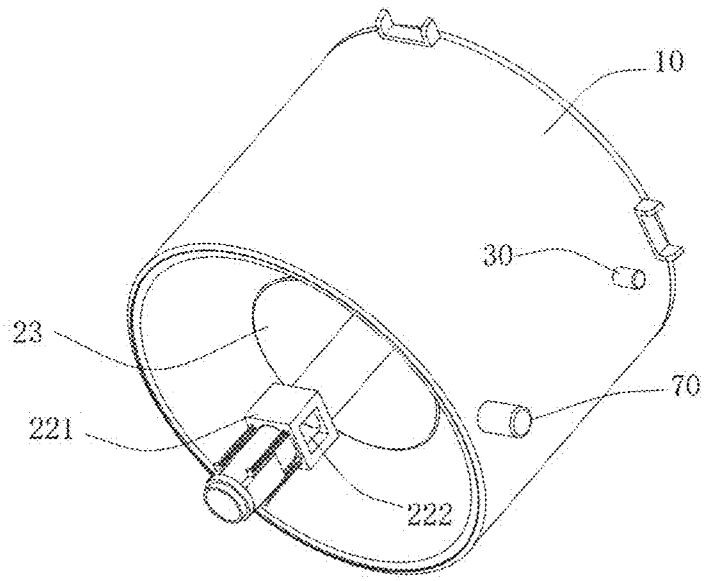
FIG. 5 is a perspective view of an engagement mechanism according to an embodiment of the present disclosure.

Referring to an embodiment in FIG. 5, the shape and position of the vertical hollow tube 21 are designed, such that the gas can experience a preliminary contact with the condensate when flowing in the vertical hollow tube 21. Owing to the presence of pressure differences, the gas at the inlet 12 will continuously enter the vertical hollow tube 21. After the gas entering the conical tube 23, the gas will be distributed along the cavity of the conical tube 23 to spread downward, so as to increase contact time of the gas and the LNG while avoiding expanding diffusion area of the gas after entering the LNG, which can fully utilize the condensate in the primary condensation cavity 20 with finite volume.

Figure 3:
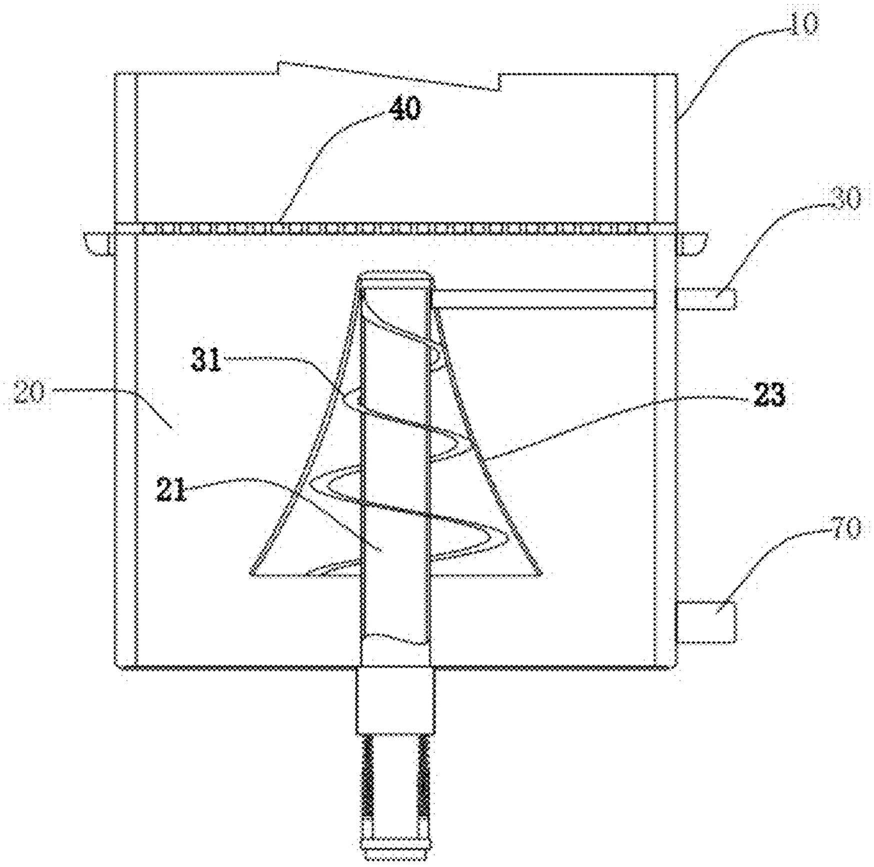
FIG. 3 is a cutaway view of a tank body according to an embodiment of the present disclosure.
Figure 4:
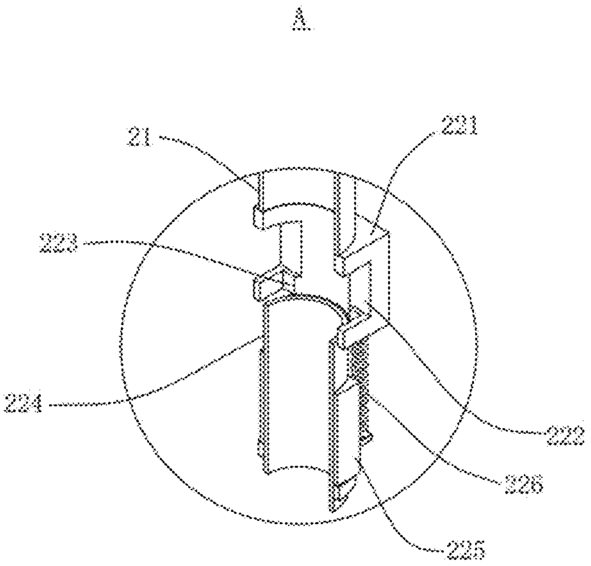
FIG. 4 is an enlarged view of part A in FIG. 2.

Referring to FIGS. 3-4, however, after the BOG is fed from the inlet 12 and the pressure difference disappears, the BOG which is not discharged will be retained in the vertical hollow tube 21 because of the presence of a length of the vertical hollow tube 21, which causes the BOG to return into the external environment. In view of the above problems, the engagement mechanism includes a square block 221 fixedly connected with the bottom of the vertical hollow tube 21. An interior of the square block 221 is hollow, and two sides of the square block 221 are each provided with a through groove 222. An inner side of the through groove 222 is provided with an enclosed slot 223. An end surface of the square block 221 away from the vertical hollow tube 21 is movably provided with a connecting tube 224. Two sides of the connecting tube 224 corresponding to the enclosed slot 223 are each fixedly provided with a closing plate 225, and two sides of the closing plate 225 are each provided with a return spring 226. A first end of the return spring 226 is fixedly connected with the closing plate 225, and a second end of the return spring 226 is fixedly connected with the square block 221. In an embodiment, at the beginning, the connecting tube 224 is located at an outside of the square block 221. In use, the connecting tube 224 is pushed to be inserted into the square block 221 through the inlet 12, and at this time, the return spring 226 is squeezed and has an elastic potential energy. The closing plate 225 is configured to be insertable into the enclosed slot 223 along with the closing plate 224, at this time, the closing plate 225 is closed, and the through groove 222 of the square block 221 are closed. The gas at the inlet 12 can enter the vertical hollow tube 21 through the connecting tube 224. After condensing, the inlet 12 leaves from the connecting tube 224, and under the action of the elastic potential energy of the return spring 226, the connecting tube 224 is forced to leave from the square block 221. At this time, the closing plate 225 leaves from the enclosed slot 223, and the through groove 222 of the square block 221 are opened. And the gas retaining in the vertical hollow tube 21 will directly enter the primary condensation cavity 20 through the through groove 222, so as to avoid a problem of return.

Referring to FIG. 3, the LNG input pipe 30 is fixedly arranged on the top of the vertical hollow tube 21, and an outer side of the tank body 10 is provided with the LNG output pipe 70. The LNG output pipe 70 is consists of a liquid inlet and a liquid outlet. The liquid inlet of the LNG output pipe 70 is connected with outside condensate and is configured to cooperate with a communicating pipe, so as to input the condensate to the LNG input pipe 30 and finally to an interior of the tank body 10. And the condensate is discharged from the liquid outlet with the cooperation of a pump. A liquid level limit sensor is arranged in the primary condensation cavity 20 to limit a height of the condensate in the primary condensation cavity 20 to a certain position, so that the liquid inlet reaches a balance state with the liquid outlet, and a liquid level is kept at a certain height. A temperature of the condensate in the primary condensation cavity 20 is reduced by continuously and cyclically inputting the LNG to accelerate condensation of the BOG, so as to realize an effect of cyclically inputting the LNG. A spiral plate 31 is arranged around an interior of the conical tube 23 from top to bottom, and is arranged on a condensate delivering path in the LNG input pipe 30. In an embodiment, the LNG enters the primary condensation cavity 20 from the LNG input pipe 30, and will spiral along the spiral plate 31 when entering because the presence of the spiral plate 31 affects a flow direction of the LNG. At the beginning, under the action of pressure difference, the LNG will form a vortex after entering the spiral plate 31. Because of the presence of the spiral plate 31, the vortex will conduct downward from a top of the conical tube 23, and will gradually disappear after reaching a bottom of the conical tube 23 because of the presence of a guard wall of the conical tube 23. Therefore, when the BOG enters the primary condensation cavity 20 from the conical tube 23, the presence of the vortex of the condensate accelerates a diffusion of the condensate, which improves condensation efficiency.

A top of the primary condensation cavity 20 is provided with a perforated plate 40 so that the BOG can enter an upper part of the tank body 10 through holes of the perforated plate 40 to perform other processing.

Figure 6:
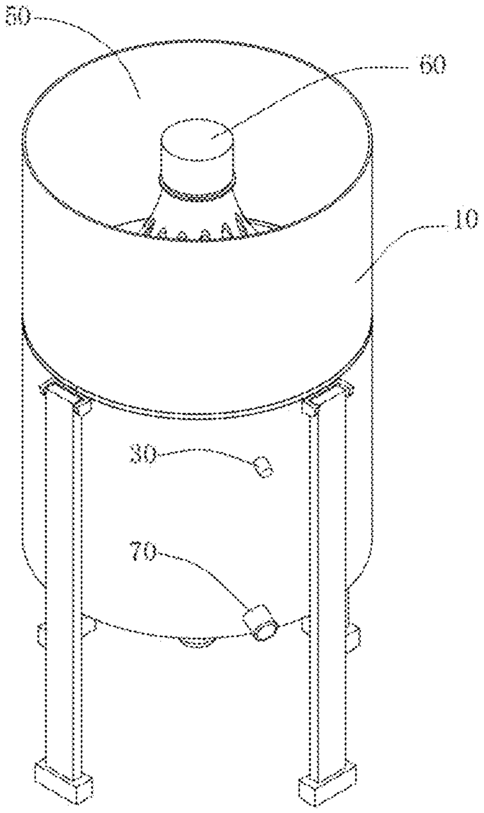
FIG. 6 is a perspective view of a secondary condensation cavity in the tank body according to an embodiment of the present disclosure.
Figure 7:
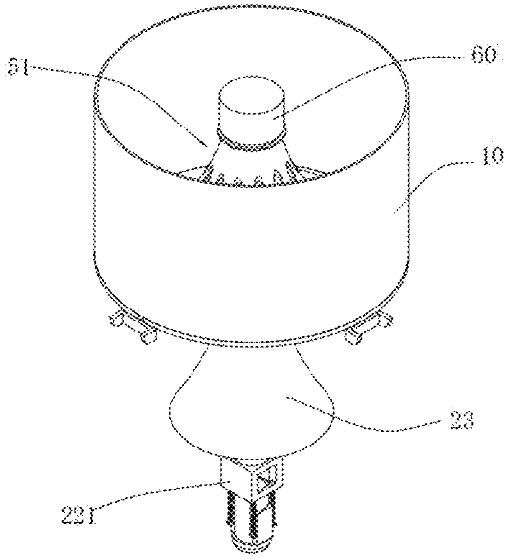
FIG. 7 schematically depicts connection of the secondary condensation cavity and the primary condensation cavity according to an embodiment of the present disclosure.

Referring to FIGS. 6-7, a secondary condensation unit is provided above the primary condensation cavity 20, and an upper part of the primary condensation cavity 20 is atomized and cooled by a spray device to realize secondary condensation effect. However, it is not significant to only adapt atomization. Therefore, in view of the above problems, technical solutions are as follows. A secondary condensation cavity 50 is provided inside the tank body 10 and above the primary condensation cavity 20, and the perforated plate 40 is configured to separate the secondary condensation cavity 50 and the primary condensation cavity 20. And the gas which is preliminarily condensed in the primary condensation cavity 20 and is performed secondary condensation after entering the upper part of the tank body 10 through the holes of the perforated plate 40.

The secondary condensation cavity 50 includes a conical table 51. An interior of the conical table 51 is provided with a conical cavity, and the conical cavity is configured to receive gas from the primary condensation cavity 20. An atomizing sprayer 60 is fixedly arranged on a top of the conical table 51, and the atomizing sprayer 60 is connected with the pump through a connecting pipe which is not shown in the figure. The pump is provided in the primary condensation cavity 20, and can directly pump the LNG in the primary condensation cavity 20 to the secondary condensation cavity 50. The LNG is atomized under the action of the atomizing sprayer 60, and the atomizing sprayer 60 is configured to produce an atomized mist within an annular range to cool and condense the gas from the primary condensation cavity 20. The conical table 51 has an inverted trumpet shape, and the conical table 51 consists of a mouth portion 521 and a trumpet-shaped body 522. The trumpet-shaped body 522 is provided with a plurality of leakage holes 52 to discharge the gas from the primary condensation cavity 20. The mouth portion 521 is provided with an arc return port 523. The LNG condensate formed by the spraying operation will slide from top to bottom along a surface of the conical table 51, and finally flow back to the primary condensation cavity 20 through the arc return port 523. Further, in combination of the pump and a cooler, the LNG can be recovered.

Figure 8:
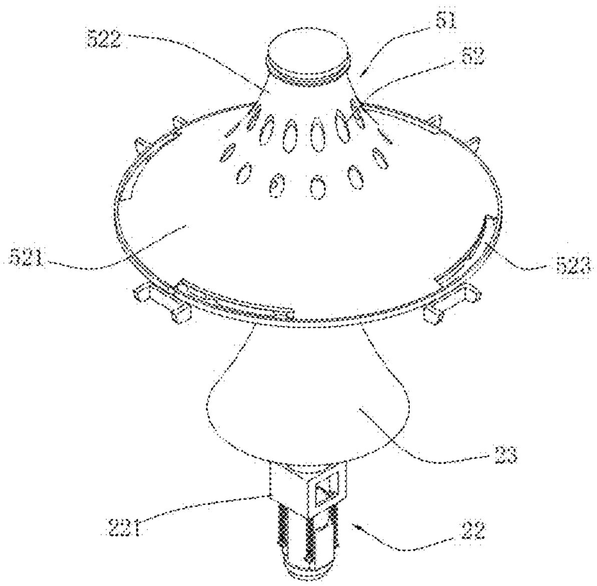
FIG. 8 is a schematic diagram of a conical table according to an embodiment of the present disclosure.
Figure 9:
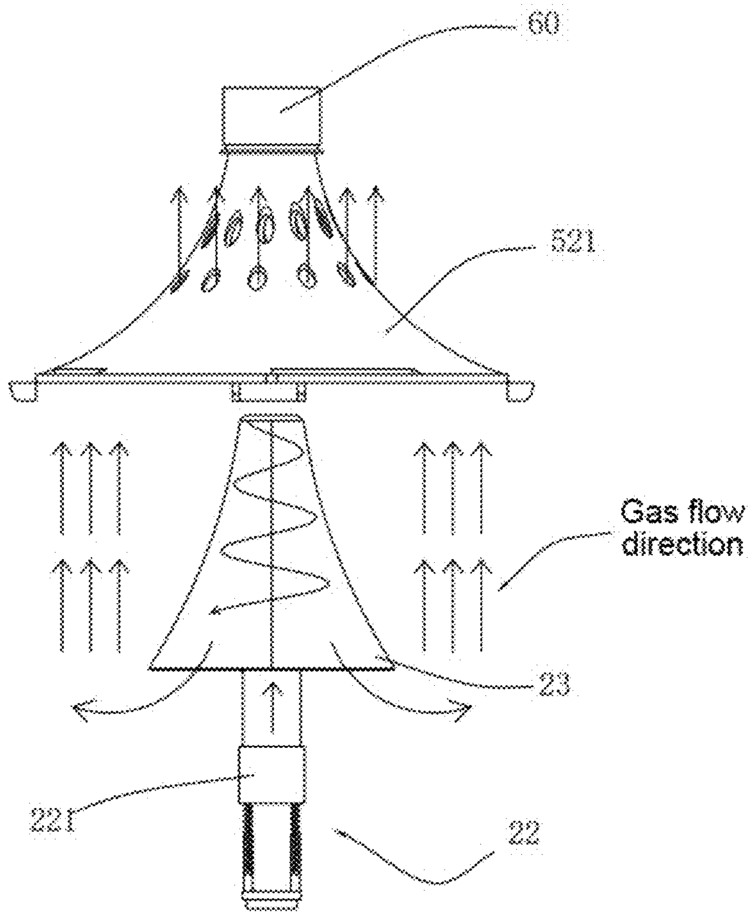
FIG. 9 schematically shows gas flow in the tank body according to an embodiment of the present disclosure.

It should be noted that, referring to FIGS. 8-9, the top of the primary condensation cavity 20 is capped by the conical table 51, so as to reduce the volatilization of cool gas in the primary condensation cavity 20. Compared to an open condensation cavity in the prior art, the conical table 51 is configured to better maintain temperature of the primary condensation cavity 20 to slow down temperature rise. In addition, because the trumpet-shaped body 522 is provided as an arc surface, in the process of the residual gas is cooled and condensed by the gas sprayed from the atomizing sprayer 60, and the annular range aerosol will form a barrier above the residual gas to block the gas from the leakage holes 52. The gas can form a sinking effect so as to delay a time that the gas is discharged from the tank body again. Besides, positions of the leakage holes 52 are configured to better be close to a position of lowest temperature of the atomizing sprayer 60. In the atomization process, the low-temperature mist will gradually reach the temperature inside the tank body 10, and the area around the mist just sprayed out has the lowest temperature, so the leakage holes 52 are arranged so that they can directly face towards this area. The gas is condensed in the area with the lowest temperature, and the part without being condensed will be hindered by the mist to diffuse to two sides, and then rise to leave the tank body, thereby extending the retention time and improving the condensing effect.

What is claimed is:

1. A condensation-recovery device for overpressure gas, comprising:

a tank body; and a primary condensation cavity;

wherein an upper end of the tank body is connected with an outlet, and a lower end of the tank body is connected with an inlet;

the primary condensation cavity is arranged at a bottom of the tank body, and an interior of the primary condensation cavity is configured to store a liquefied natural gas (LNG) to condense the overpressure gas comprising boil-off gas (BOG); the primary condensation cavity comprises a vertical hollow tube arranged in the tank body; a bottom of the vertical hollow tube is provided with an engagement mechanism; and a conical tube is fixedly arranged at a top of the vertical hollow tube, and the conical tube is communicated with the vertical hollow tube; and the engagement mechanism comprises a square block; the square block is fixedly connected with the bottom of the vertical hollow tube; an interior of the square block is hollow, and two sides of the square block are each provided with a through groove; an inner side of the through groove is provided with an enclosed slot; an end surface of the square block away from the vertical hollow tube is movably provided with a connecting tube; and two sides of the connecting tube corresponding to the enclosed slot are each fixedly provided with a closing plate, and two sides of the closing plate are each provided with a return spring.

2. The condensation-recovery device of claim 1, wherein a side wall of the conical tube is provided with a cavity, and the cavity is communicated with a hollow portion of the vertical hollow tube.

3. The condensation-recovery device of claim 1, wherein a size and a position of the closing plate are configured to fit the enclosed slot, and the closing plate is configured to be insertable into the enclosed slot to block the through groove.

4. The condensation-recovery device of claim 1, wherein the tank body is connected with an LNG input pipe and an LNG output pipe; the LNG input pipe is configured to extend into the primary condensation cavity, and an end of the LNG input pipe is fixedly communicated with a top of the conical tube; and a spiral plate is arranged around an interior of the conical tube from top to bottom, and the spiral plate is arranged on an LNG delivering path in the LNG input pipe.

5. The condensation-recovery device of claim 1, wherein a top of the primary condensation cavity is provided with a perforated plate; after the LNG is fed into the primary condensation cavity, a liquid level of the LNG in the primary condensation cavity is lower than the perforated plate; and residual gas in the primary condensation cavity is allowed to be discharged from holes of the perforated plate to an upper part of the tank body.

6. The condensation-recovery device of claim 5, wherein an LNG output pipe is provided on a bottom of the primary condensation cavity.

7. The condensation-recovery device of claim 1, wherein a secondary condensation cavity is provided inside the tank body and above the primary condensation cavity; the secondary condensation cavity comprises a conical table; an interior of the conical table is provided with a conical cavity, and the conical cavity is configured to receive the BOG from the primary condensation cavity; an atomizing sprayer is fixedly arranged on a top of the conical table; and the atomizing sprayer is configured to produce an atomized mist within an annular range to cool and condense the BOG from the primary condensation cavity.

8. The condensation-recovery device of claim 7, wherein the conical table has an inverted trumpet shape, and the conical table consists of a mouth portion and a trumpet-shaped body; and the trumpet-shaped body is provided with a plurality of leakage holes to discharge the BOG from the primary condensation cavity, and the mouth portion is provided with an arc return port.

9. The condensation-recovery device of claim 8, wherein the plurality of the leakage holes are circumferentially provided on the trumpet-shaped body at different heights.

* * * * *